US010362835B2

(12) United States Patent
Tawney et al.

(10) Patent No.: US 10,362,835 B2
(45) Date of Patent: Jul. 30, 2019

(54) STROBEL LASTED INJECTED FOOTWEAR

(71) Applicant: Fuerst Group, Inc., Menlo Park, CA (US)

(72) Inventors: John Tawney, Portland, OR (US); Carina Hamel, Portland, OR (US); Rory Fuerst, Jr., Portland, OR (US)

(73) Assignee: Fuerst Group, Inc., Menlo Park, CA (US)

( * ) Notice: Subject to any disclaimer, the term of this patent is extended or adjusted under 35 U.S.C. 154(b) by 287 days.

(21) Appl. No.: 14/751,025

(22) Filed: Jun. 25, 2015

(65) Prior Publication Data

US 2015/0374070 A1    Dec. 31, 2015

Related U.S. Application Data

(60) Provisional application No. 62/016,983, filed on Jun. 25, 2014.

(51) Int. Cl.
*A43B 1/14*    (2006.01)
*A43B 7/12*    (2006.01)
(Continued)

(52) U.S. Cl.
CPC ........... *A43B 13/42* (2013.01); *A43B 1/14* (2013.01); *A43B 7/12* (2013.01); *A43B 9/00* (2013.01);
(Continued)

(58) Field of Classification Search
CPC .. A43B 13/42; A43B 1/14; A43B 7/12; A43B 9/00; A43B 13/38; A43B 7/28;
(Continued)

(56) References Cited

U.S. PATENT DOCUMENTS 2,794,270 A    6/1957    Dubner
2,896,202 A    7/1959    Bonanno
(Continued)

FOREIGN PATENT DOCUMENTS

EP    0823323 A1    2/1998
EP    1243190 A1    9/2002
(Continued)

OTHER PUBLICATIONS

ISA Korean Intellectual Property Office, International Search Report and Written Opinion Issued in Application No. PCT/US2013/023285, dated Jun. 2, 2013, WIPO, 9 pages.
(Continued)

*Primary Examiner* — Anna K Kinsaul
*Assistant Examiner* — F Griffin Hall
(74) *Attorney, Agent, or Firm* — McCoy Russell LLP (57) ABSTRACT

Port-injection footwear is provided. In one example, port-injection footwear is provided including a footwear-structure bag encompassing an injected filler material, such as foam. A strobel sock made of stretchable material may be integrated into an insole region of the footwear-structure bag. The port-injection footwear further may include a foam barrier disposed adjacent to the footwear-structure bag to retain the injected foam within the bag during injection. An outsole may be directly coupled to the footwear-structure bag forming a base of the footwear article. In other examples, the port-injection footwear may include a footwear-structure bag having an injection port, an injected foam retained in the footwear-structure bag, where the injected foam was injected through the injection port, and a port cap positioned at the injection port of the footwear-structure bag.

16 Claims, 6 Drawing Sheets

(51) Int. Cl.
*A43B 9/00* (2006.01)
*A43C 5/00* (2006.01)
*A43B 13/38* (2006.01)
*A43B 13/42* (2006.01)
*B29D 35/00* (2010.01)
*B29D 35/04* (2010.01)

(52) U.S. Cl.
CPC .............. *A43B 13/38* (2013.01); *A43C 5/00* (2013.01); *B29D 35/0009* (2013.01); *B29D 35/04* (2013.01)

(58) Field of Classification Search
CPC ..... A43B 23/0245; A43B 3/0036; A43B 9/18; A43B 23/0205; A43B 9/06; A43B 9/08; A43C 5/00; B29D 35/0009; B29D 35/04; B29D 35/146; B29D 35/06
USPC ....... 36/87, 98, 45, 47, 48, 88, 154, 93, 3 A, 36/84
See application file for complete search history.

(56) References Cited

U.S. PATENT DOCUMENTS

| | | | |
|---|---|---|---|
| 3,121,430 A | 2/1964 | O'Reilly | |
| 3,169,326 A * | 2/1965 | Butera | A43B 7/141 12/142 R |
| 3,362,091 A * | 1/1968 | Drago | A43B 5/04 12/142 R |
| 3,786,580 A * | 1/1974 | Dalebout | A43B 5/0405 12/142 P |
| 3,810,319 A * | 5/1974 | Famolare, Jr. | A43B 1/14 36/11.5 |
| 3,921,313 A | 11/1975 | Mahide et al. | |
| 4,042,663 A | 8/1977 | Harder, Jr. | |
| 4,120,064 A * | 10/1978 | Salomon | A43B 5/0405 12/142 R |
| 4,245,410 A * | 1/1981 | Molitor | A43B 7/12 36/117.1 |
| 4,333,193 A | 6/1982 | Bartneck | |
| 4,414,762 A * | 11/1983 | Salomon | A43B 5/0405 12/142 P |
| 4,428,089 A * | 1/1984 | Dawber | A43B 5/0405 12/142 R |
| 4,627,179 A * | 12/1986 | McElroy | A43B 17/14 36/154 |
| 4,744,157 A * | 5/1988 | Dubner | A43B 7/28 36/117.6 |
| 4,809,379 A * | 3/1989 | Jungwirth | A43B 5/0405 12/142 R |
| 4,845,862 A * | 7/1989 | Phillips, Jr. | A43B 1/14 36/83 |
| 5,101,580 A | 4/1992 | Lyden | |
| 5,353,525 A | 10/1994 | Grim | |
| 5,360,831 A | 11/1994 | Lidy et al. | |
| 5,667,738 A | 9/1997 | Krajcir | |
| 5,785,909 A * | 7/1998 | Chang | B29C 44/1233 264/161 |
| 5,885,500 A * | 3/1999 | Tawney | B29C 44/569 264/154 |
| 5,955,159 A * | 9/1999 | Allen | A43B 7/02 36/88 |
| 6,024,712 A | 2/2000 | Iglesias et al. | |
| 6,026,595 A | 2/2000 | Curry | |
| 6,050,964 A | 4/2000 | Yates | |
| 6,205,683 B1 | 3/2001 | Clark et al. | |
| 6,226,895 B1 | 5/2001 | McClelland | |
| 6,314,663 B1 | 11/2001 | Saldana | |
| 6,604,302 B2 | 8/2003 | Polegato Moretti | |
| 6,746,027 B1 | 6/2004 | Soo | |
| 6,763,609 B2 | 7/2004 | Su | |
| 7,081,221 B2 | 7/2006 | Paratore et al. | |
| 7,131,220 B1 | 11/2006 | Richey | |
| 7,762,011 B2 * | 7/2010 | Fuerst | A43B 1/0027 36/11.5 |
| 8,056,260 B2 * | 11/2011 | Ho | A43B 9/06 12/142 D |
| 8,215,032 B2 | 7/2012 | Sokolowski et al. | |
| 8,677,656 B2 * | 3/2014 | Nishiwaki | A43B 7/16 36/69 |
| 8,857,076 B2 | 10/2014 | Langvin et al. | |
| 2001/0016992 A1 | 8/2001 | Gross | |
| 2001/0032399 A1 * | 10/2001 | Litchfield | A43B 1/0072 36/88 |
| 2002/0053148 A1 | 5/2002 | Haimerl | |
| 2003/0046831 A1 | 3/2003 | Westin | |
| 2004/0007836 A1 * | 1/2004 | Sauter | A43B 5/0401 280/11.221 |
| 2004/0231190 A1 | 11/2004 | Seamans | |
| 2005/0060914 A1 * | 3/2005 | Fuerst | A43B 1/14 36/102 |
| 2007/0011914 A1 | 1/2007 | Keen et al. | |
| 2009/0320329 A1 | 12/2009 | Darby, II et al. | |
| 2010/0050470 A1 | 3/2010 | Hubner | |
| 2010/0139853 A1 * | 6/2010 | Park | A43B 23/0215 156/245 |
| 2010/0242312 A1 | 9/2010 | Lim et al. | |
| 2011/0119956 A1 * | 5/2011 | Borel | A43B 9/02 36/44 |
| 2012/0023686 A1 | 2/2012 | Huffa et al. | |
| 2012/0056345 A1 | 3/2012 | Lee | |
| 2012/0204448 A1 * | 8/2012 | Bracken | A43B 7/26 36/103 |
| 2012/0304489 A1 | 12/2012 | Vattes et al. | |
| 2013/0192086 A1 | 8/2013 | Tawney et al. | |
| 2015/0374070 A1 * | 12/2015 | Tawney | A43B 13/42 36/87 |
| 2016/0021980 A1 * | 1/2016 | Scofield | A43B 23/07 36/87 |
| 2016/0095383 A1 * | 4/2016 | Surace | A43B 21/24 36/93 |
| 2016/0128421 A1 * | 5/2016 | Canova | A43B 7/28 36/93 |
| 2016/0185062 A1 * | 6/2016 | Boucher | A43B 7/12 264/516 |

FOREIGN PATENT DOCUMENTS

| | | |
|---|---|---|
| EP | 1336347 A1 | 8/2003 |
| JP | H1175908 A | 3/1999 |
| WO | 0101807 A1 | 1/2001 |
| WO | 2010003414 A1 | 1/2010 |

OTHER PUBLICATIONS

ISA Korean Intellectual Property Office, International Search Report and Written Opinion Issued in Application No. PCT/US2015/037817, dated Sep. 18, 2015, WIPO, 11 pages.

\* cited by examiner

STROBEL LASTED INJECTED FOOTWEAR

CROSS REFERENCE TO RELATED APPLICATIONS

The present application claims priority to U.S. Provisional Patent Application No. 62/016,983, entitled "STROBEL LASTED INJECTED FOOTWEAR," and filed on Jun. 25, 2014, the entire contents of which are hereby incorporated by reference for all purposes.

BACKGROUND/SUMMARY

Conventional footwear manufacture has continued to rely on hand-stitching and adhesives to assemble footwear components into a finalized product. For example, individual components comprising the lower (e.g. outsoles) and uppers (used herein to refer to midsoles, side walls, and other upper components), may be hand-stitched and/or adhered together to form a finished product. The reliance on manual labor and the assembly from multiple components results in variations in the footwear, including variations in sizing and quality.

To accommodate the variety of methods and tools for making various shoe styles, a single footwear manufacturer may maintain many types of skilled labor, stocks of raw materials and production machinery that are used to produce a variety of footwear elements. The variety in manufacture complicates shoe construction across an entire product line and may cause further difficulty in achieving uniform sizing.

Furthermore, different methods of shoe construction require specialization in skills. Strobel lasted shoes are common among casual, athletic and work footwear, among others. A strobel sock spans the interior or a portion of the bottom of an article of footwear and may be hand stitched to the upper. Strobel lasting may provide increased stability, flexibility or durability in addition to weight savings to an article of footwear. Because of the three dimensional structure of the footwear where the strobel meets a shoe upper, and the often narrow spacing for the stitch, this type of assembly may utilize extensive, and complicated hand labor. Additionally, strobel construction may further make extensive use of adhesives to affix the strobel sock to the shoe upper and/or midsole.

As mentioned above, to assemble the many individual components, footwear construction approaches commonly use solvent-based adhesives to bond various components together. For example, solvent-based adhesives, including organic solvents, may be used in the footbed, the outsole, the midsole, the insole, etc. Different materials may be coupled together using adhesives such that the footwear is held together primarily by adhesives.

When used in the construction process, solvent-based adhesives may emit volatile organic compounds (VOCs), which can produce indoor and/or outdoor air pollution, and thus, degrade the quality of the environment. In addition to emissions generated during the application and/or curing processes, excess adhesive in the manufacturing process may also be considered environmental waste, also potentially impacting the quality of the environment. In fact, various regulations exist with regard to use, handling, and disposal of solvent-based adhesives.

In addition to the use of adhesives, traditional injection molding is typically used to form components or portions of components of footwear. Many outsoles, midsoles and even uppers are produced by injection of a hardenable thermoplastic material, typically polyurethane, into preformed molds. Conventional methods of injection molding inject the material into a mold, which seals around the material as it dries. Molds that are worn, poorly constructed or overfilled may not form an effective seal resulting in material spilling beyond the mold, known as flashing. Because the moldable material is injected directly into the mold, traditional injection molding requires extensive cleaning upon removal of hardened products. Additionally, every variation to a traditional injection molded product, such as alteration in sizing, design, pattern, or structure requires a new mold resulting in a costly process.

Injection molding of polyurethane or a similar thermoplastic material in the presence of a textile is used in a variety of contexts in constructing footwear. For example, injection molding of textiles has been used to bond fabric shoe uppers to an injection molded insole, to create foam-filled shoe uppers, fabric-bonded boot liners and the like. The injection molding of textiles also uses a mold manufacture style. In some embodiments, an aluminum casting may be closed and sealed around the moldable material. In the case of fabric-bonded injection molded footwear components, the mold may be lined with a textile. Foam may be injected into the fabric lined mold so that, as the foam dries, the hardenable material adopts the shape of the mold and becomes bonded to the fabric. Like conventional injection molding in the absence of a fabric layer, cleanup of molds after hardening is extensive. Additional processing methods are typically required including trimming of excess injected or fabric material, and stitching, adhering or otherwise attaching additional design elements.

The Inventors herein have recognized the above several drawbacks of traditional methods of shoe manufacture. As discussed above, the heavy reliance on solvent-based adhesives can negatively impact the quality of the environment during construction. Additionally the reliance on construction by hand and multiple methods of manufacture for varied product types complicates the manufacture process and makes uniformity in sizing difficult. Traditional construction of footwear articles comprising a strobel sock makes use of extensive and complicated hand labor. Furthermore, traditional methods of injection molding and of fabric-bonded injection molding require extensive set up and cleaning of molds during manufacture. The reliance on molds makes for a significant investment in different molds across a product line to produce elements in varied sizes and styles. Moreover, conventional methods of fabric-bonded injection molding produce components of footwear that necessitate additional structures and assembly for development into completed footwear.

Recognizing these drawbacks, the Inventors describe herein a port-injection footwear in which use of a closed mold is unnecessary and in particular strobel lasted, port-injection footwear. Obviation of the traditional mold is achieved by direct injection of foam, such as polyurethane, into a bag, such as a footwear-structure bag. This bag forms a substantially sealed cavity between a foot surface and the exterior to form an integrated footwear component, such as a portion of an upper. The bag forms an integrated footwear component (e.g. one or more of midsole, insole, sidewall and upper), protected by the attached outsole. A stretchable strobel sock may further be integrated into the footwear structure bag. However, in other examples, the strobel sock may be integrated into the outsole. Integration of multiple elements of footwear to form an integrated footwear component simplifies manufacture and produces a product which may be more durable and/or stable. Further, the reduction in adhesives enables footwear incorporating the direct injection method to reduce negative impacts on the quality of the environment. Reduction in adhesive use further reduces labor in shoe construction and may create a more flexible shoe structure when desired.

The present application discloses port-injection footwear made with a strobel sock. The strobel sock may provide weight savings and added flexibility to an article of footwear. Utilizing a stretchable material a strobel sock may be incorporated into a footwear-structure bag that is then injected with foam or other material in the presence of an elongated last that is extended in the base of the footform compared to a conventional last. Upon removing the elongated last the strobel sock shrinks back to its original size and forms a footbed of an article of port-injection footwear. Additional steps and extensive hand stitching to finish the footwear may be avoided in this way.

Port-injection footwear of the present disclosure may be adapted to a variety of types of footwear. The substantially sealed bag that retains the injected foam may be attached to many types of outsoles by a variety of attachment methods. Also, the shoe sidewalls and upper may adopt different shapes and utilities, such as that of a sandal, boot, sneaker or other type of footwear.

Thus, in summary, the inventors herein disclose port-injection footwear having a footwear-structure bag with an integrated strobel sock encompassing a foam core. The bag may be attached to a separately formed outsole. In one embodiment, the footwear of the present disclosure may have an integrated upper formed at least partially by a footwear-structure bag inflated by an injectable polymer and an insole comprising a strobel sock. Furthermore, the footwear of the present disclosure may be formed while the bag is expanded during injection around an elongated last or foot-shaped form. With a uniform, elongated last, regularity of sizing may be achieved as the strobel sock shrinks to original size when the elongated last is removed. The method of the present disclosure allows for widely varied product design and finish detailing such as pattern and shape molding, which may be achieved using modular shaping tools that can be used across footwear styles and sizes and may not fully enclose nor seal onto the direct injected foam material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A strobel lasted, port-injection footwear article is disclosed herein. In one example, a footwear article is provided including a footwear-structure bag comprising an integrated strobel sock encompassing an injected foam core. The footwear article may further include a foam barrier disposed adjacent to the footwear-structure bag to retain the injected foam within the bag during injection. An outsole may be directly coupled to the footwear-structure bag forming a base of the footwear article. In some embodiments, the footwear-structure bag forms an integrated footwear component. As another example, a footwear article is further provided including a footwear-structure bag having an injection port where an injected foam is injected through the injection port and retained in the footwear-structure bag. A port cap may be positioned at the injection port of the footwear-structure bag.

Figures 1A, 1B, 1C:
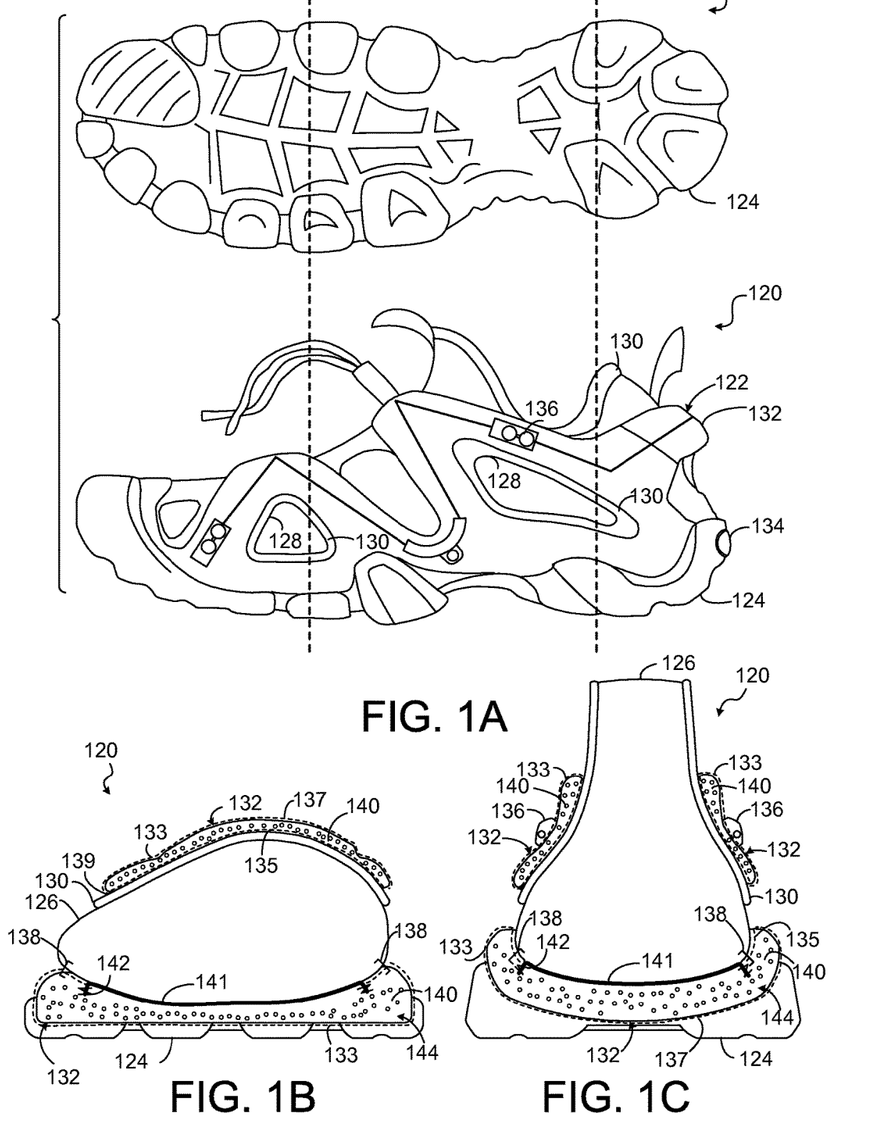
FIG. 1A is a schematic illustration of port-injection footwear according to an embodiment of the disclosure.
FIG. 1B is an illustration of the port-injection footwear shown in FIG. 1A taken at cross section I of FIG. 1A.
FIG. 1C is an illustration of the port-injection footwear shown in FIG. 1A taken at cross section II of FIG. 1A

Turning first to FIG. 1, FIGS. 1A-C illustrate an example of strobel lasted port-injection footwear 120 in accordance with the disclosure. Specifically, FIG. 1A illustrates a bottom and a side view of footwear article 120. The bottom view and side view are cut through lines I and II and cross-sectional views from lines I and II are shown in FIGS. 1B and 1C, respectively. It should be appreciated that the footwear article is provided for illustrative purposes and that the features and description are not intended to be limiting in any way.

In the illustrated figures, footwear article 120 includes a lower, shown as outsole 124. Outsole 124, also referred to as the sole of the shoe, forms a base for footwear article 120. The shape and features of outsole 124 may vary and the outsole is not intended to be limited by the disclosure.

The outsole may be formed of polyurethane, other polymers, rubbers and plastics, as well as more traditional materials such as wood, leather or cord or combinations thereof. In some examples, the outsole may be formed by traditional injection molding methods such as by injection of polyurethane into an aluminum mold by a desma machine or a similar process. It should be appreciated that the outsole may be manufactured separately from the rest of the shoe.

In the disclosed embodiment, preformed outsole 124 may be directly coupled to an upper 122 of footwear article 120. Upper, as used herein, includes, but is not limited to, the toe box, the vamp, the heel counter, the midsole, insole, etc. For purposes of this disclosure, the lower is limited to the outsole and the immediate features of the outsole.

As described in more detail below, upper 122 may be formed, or at least partially formed, from a footwear-structure bag, indicated generally at 132. In some examples, the outsole may be directly coupled to the footwear-structure bag forming a base for the footwear article.

The footwear-structure bag 132 may form an integrated footwear component, including one or more portions or sections of the upper 122. For example, multiple shoe components, such as a sidewall, midsole, and strobel sock may be integrated within the footwear-structure bag to form an integrated footwear component. As such, in some embodiments, the footwear-structure bag may form a unitary body to enhance support of the footwear. This combining of multiple components further may act to lock or secure the components together. It should be appreciated that the foam and bag construction and the locking configuration may result in an enhanced durability and reduced reliance on adhesives.

Further, footwear-structure bag 132 may include a plurality of surface features described in more detail herein. Surface features may include, by way of example, windows, bands, ridges, cord, webbing, eyelets or other features. As an example, port-injection footwear 120 illustrates cutout sections or windows 128 on the sidewalls outlined by lining fabric 130. As another non-limiting example, other surface features may be integrated as part of the footwear-structure bag (and thus, the upper of the footwear article), including but not limited to eyelets 136, loop holes, ridge patterns, etc.

Generally, and as disclosed in more detail below, the footwear-structure bag may be secured or otherwise coupled to an outsole. In one example, after coupling of the footwear-structure bag to the outsole, the footwear-structure bag, being a hollow bag structure, may be adapted to receive an injection of foam through a port injector or foam injector. The foam may expand to form a shape at least partially dictated by the design of the hollow bag structure, the upper design, the outsole and/or a last. In the particular case of a footwear structure bag comprising a stretchable strobel sock, foam injection may occur in the presence of an elongated last with an extended base in the insole area of the foot-form. As described in greater detail below in reference to FIG. 3A-C an elongated last may expand the stretchable strobel sock during foam injection.

As one non-limiting example, a hollow bag structure may be composed of a series of tubes that inflate to form strap-like elements. In other examples, the combination of the foot form and bag shape may control the shape. Further, in other examples, external shaping and molding tools may be used to control the bag shape and the surface features as the foam is injected and expanded in the footwear-structure bag.

It should be appreciated that the footwear-structure bag may include at least one inlet injection port or opening for receiving the injection of foam. In one example, an injection port may be sized to prevent leakage of foam during port injection and may be limited to the size of the foam injector. Thus, the injection port may be a small opening corresponding to the port injector valve tip. As the foam is injected into the footwear-structure bag, the foam expands within the bag. The footwear-structure bag may encompass or enclose the foam such that the foam or foam core is encapsulated within the bag.

A port cap, indicated schematically, at 134 may by positioned at the injection port. The port cap may operate to close the inlet injection port. In some non-limiting examples, the port cap may be sized to sufficiently cover the injection port while not extending substantially beyond the port. The port cap may be integrated within the outsole or upper and may be a visible aspect of the footwear. In other examples, the port cap may be hidden or concealed by other features of the footwear. Furthermore, in some examples, the footwear-structure bag and injection port may extend through the outsole as seen in FIG. 1A such that the cap is received in a recess or other portion of the outsole. The location of the port may vary without departing from the scope of the disclosure.

Furthermore, an article of footwear in accordance with the present disclosure may be constructed without a cap on an injection port. For example, in some embodiments the footwear structure bag may include an open injection port on or within the footwear article on any surface of the footwear article. Further, as a non-limiting example, the injection port may be configured or molded in such a way as to seal the injected foam within the footwear and as the foam hardens the injection port may become the exterior of the article of footwear.

Turning now to FIG. 1B, footwear article 120 is shown in a cross-sectional view from line I, where a foot 126 is disposed within footwear article 120. As illustrated, lining fabric 130 may be disposed adjacent to the foot form. Although shown with lining fabric extending along or adjacent the footwear-structure bag, it should be appreciated that the lining fabric is not required and that other materials or no materials may be used between the footwear-structure bag and a user's foot. Further, in some examples, the lining fabric may be integrated as part of the footwear-structure bag or may form an additional layer adjacent or in close proximity to the footwear-structure bag. In some examples, the lining fabric 130 may be physically coupled to an internally facing surface of the footwear-structure bag 132, but not on an insole region 144 of the bag 132. Specifically, the lining fabric 130 may be physically coupled to an internally facing foam barrier 133 of the footwear-structure bag 132.

The footwear-structure bag 132 may include one or more foam barriers 133 indicated by the dashed line in FIGS. 1B and 1C. It should be appreciated, that the foam barrier and footwear-structure bag may be, in some instances, the same material, while in other embodiments the foam barrier comprises an additional layer, coating, or lining described in greater detail below. In some examples, the foam barrier 133 may be disposed on an internal facing surface, such as indicated at 135. Further, in some embodiments, the foam barrier and footwear-structure bag may form a two-layer construction, where the foam barrier is on an opposite surface of a section of the footwear-structure bag. For example, as shown in FIG. 1B, the foam barrier may be on an internal facing surface of a section of the footwear-structure bag, indicated at 135 and may be on an external or opposing surface of a second section of the bag, as indicated at 137. It should be appreciated that other configurations for the foam barrier may be used without departing from the scope of the disclosure. The foam barrier is considered a filler material barrier.

Sections with a foam barrier on an internal facing surface 135 of the footwear-structure bag may couple with join sections with a foam barrier on the external facing structure 137 of the footwear bag at a seam 139. This seam may comprise a weld, stitch, or adhesive coupling. In some examples, the seam may be positioned at the injection port. In other examples, two or more seams may be used to form a footwear-structure bag. In some examples, the seam and/or the position of the foam barrier (and the foam structure bag material and construction) may be configured so as to release air during injection of foam such that air pockets are minimized during injection of foam in the footwear-structure bag.

As mentioned above, foam barrier 133 may operate to retain the injection material 140 such as an injected foam, within the footwear-structure bag. By providing a foam barrier, during injection, the injection material 140 will be retained such that the injection material 140 does not leak from the bag. By retaining the injection material within the bag, minimal finishing/cleaning steps are used in regards to completion of the integrated footwear component.

Any suitable material or coating may be used to retain the injected foam within the bag. As such, it should be understood that the foam barrier may be a coating, lining, lamination, or other. As one, non-limiting example, the foam barrier may comprise a urethane material coating. In another example, the foam barrier may comprise a waterproof coating. It should be appreciated that a foam barrier need not be waterproof so long as it has a foam blocking capacity. Further, in some embodiments, the foam barrier may be integrated with the bag material. For example, leather may be used in the construction of the hollow bag structure and may provide its own, intrinsic, foam barrier as it is suitable to block injected foam from seeping through.

Furthermore, radiofrequency welds, expandable thread or waterproof sealants may be used on the seams of the hollow bag structure to further prevent seepage of injected foam out of the hollow bag structure.

Foam, injected in the footwear-structure bag, may be selected for its utility to a specific article of footwear which may include its thermal, durability, or permeability characteristics. Example foams, include, but are not limited to polyurethane and other expandable and hardenable thermoplastic material. Additionally, a foam's propensity to expand, its overall hardness and density, as well as the quantity of foam injected may vary and impart differing properties to a finished article of footwear. In an example, non-limiting embodiment, a polyurethane foam may be used which has a specific gravity of 0.20-0.60 g/cm$^3$ and a hardness ranging from 35-60 Asker C.

In one example, foam used as the filler within the footwear-structure bag may enhance the comfort and reduce the weight of the footwear. In other examples, the foam further may provide insulation to the footwear. Such insulation may be used to enhance cold-weather footwear and may be ventilated for warm weather footwear. Additionally, the foam may impart waterproof qualities to the footwear. In an embodiment of the present disclosure, and discussed in more detail herein, two or more bag structures within a single article of footwear may allow for different foams or fabrics to be isolated to a particular area of the foot and/or footwear to specifically exploit the varied properties of selected materials. It should be appreciated that the foam may be replaced or used in conjunction with other suitable materials, including but, not limited to gel materials, gaseous materials or mixtures, etc. As used herein, filler material, includes foam and/or any other suitable materials.

The footwear article 120 may further comprise an integrated strobel sock 141. As shown in the examples of FIGS. 1B and 1C, the strobel sock 141 may be integrated within the footwear-structure bag 132. As such, in the examples shown in FIGS. 1B and 1C, the strobel sock 141 may be integrated into the upper 122 of the footwear article 120. However, it should be appreciated that the strobel sock 141 may be used to form portions of the footwear article 120 other than the upper 122, such as the outsole 124, midsole, toe, and/or heel portions.

When formed as a part of the upper 122 as shown in FIGS. 1B and 1C, the strobel sock 141 may be attached, in an insole region 138 of the footwear structure bag by a seam 142. As shown in FIGS. 1B and 1C, the insole region 138 is a portion of the footwear article 120 disposed between the foam barrier 133 and the foot 126. Thus, the insole region 138 may be a region sized and shaped approximately the same as the outsole 124, and positioned approximately parallel to the outsole 124. The seam 142 may surround the perimeter of a strobel sock covering an entire surface of the insole region of an article of footwear (shown in FIG. 5). In another example the strobel sock may be a partial strobel sock and may, as non-limiting examples, be confined to a heel or toe region, with a different material comprising the remainder of the footbed.

Figure 4:
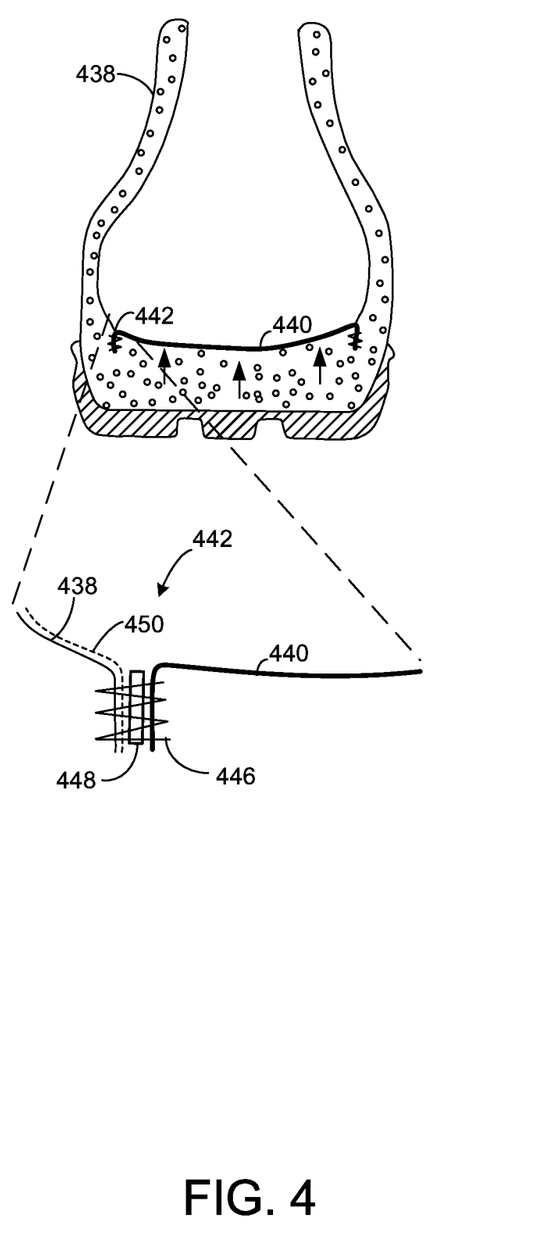
FIG. 4 is an illustration of the stitch and turn seam attachment of the strobel sock to a footwear structure bag.

The seam (i.e., stitched junction) 142 may be a stitch and turn seam (shown in greater detail in FIG. 4). The stitch and turn seam may comprise the cut ends of the material comprising the remainder of the footwear structure bag and the strobel sock turned to the interior of the footwear-structure bag, such that in a finished article of footwear the cut ends of the material of the footwear-structure bag and of the integrated strobel suck are contained within the injected foam core. The seam may further comprise stitching and/or adhesives. The seam may be completed prior to injection of foam such that after foam injection and removal of an elongated last the article of strobel lasted, port injection footwear may substantially complete. As depicted in FIG. 4, the stitch and turn seam (i.e., stitched junction) includes stitches, and the stitches may be located within an interior of the footwear-structure bag encompassed by the injected foam.

In the cross-sectional view of the article of footwear 120 shown in FIG. 1B cut out sections 128 are seen where the foot 126 is exposed to the environment. In this example, cut out sections 128 are bordered by inner lining fabric 130.

Inner lining fabric 130 may directly contact the foot 126 and may be attached to the foot-facing surface of bag structure 132. In some examples, this inner lining fabric may be selected for performance features such as wicking or insulating properties. The lining fabric may also serve an aesthetic purpose, for example creating a contrast color border to cut out section 128.

It should be understood that an article of footwear of the present disclosure need not contain cutout sections, nor lining fabric and may be constructed as a solid shoe, boot, sandal, athletic shoe, casual shoe or another form of footwear. Furthermore, the bag structure may be configured to directly engage a user's foot without necessity of a lining fabric, though one may be used as desired for aesthetic or performance reasons.

The strobel sock 141 may be used in conjunction with one or more other materials, to form a cavity, which may be configured to contain one or more filler materials. For example, as viewed in FIGS. 1A-C, footwear-structure bag 132 with integrated strobel sock 141 with foam barrier 133 forms a hollow cavity 144 that may be injected with foam 140 to create a "body" of footwear article 120. Thus, prior to foam 140 being injected into the footwear-structure bag 132, the foot-wear structure bag 132 may encompass a hollow cavity 144, which may be defined by the foam barrier 133. Foam 140 may be injected into the hollow cavity 144, and may fill the hollow cavity 144. Although in the examples of FIGS. 1B and 1C, foam is injected into the cavity defined by the strobel sock, it should be appreciated that in other examples, the cavity may be filled with another material such as a gel, plastic, etc. Further, in other examples, the cavity may be left substantially hollow, and no foam or other material may be injected into the cavity.

As such, the strobel sock 141 may form and/or define a portion of the hollow cavity 144, where the hollow cavity 144 may define a hollow region of the upper 122. However, it should be appreciated that in other examples, the strobel sock 141 may form and/or define a portion of hollow cavities which may not be a part of the upper 122, and may instead form portions of the outsole 124, midsole, heel, toe, or other regions of the footwear article 120. As shown in the example of FIGS. 1B and 1C, more than cavity 144 may be defined by the footwear-structure bag 132. In such examples, each cavity 144, may be fluidically sealed, such that injection material 140 in one cavity may not flow to any other cavity. The body may extend below the foot and/or along the upper. The width of the body may be controlled by the sizing of the bag structure, the amount of foam material, and shaping of the bag structure.

In some examples, the sizing of the body may further be controlled by the material used in construction of the footwear-structure bag. The bag may be composed of a textile material, and in some embodiments, the bag material may have a select stretch level. For example, in some embodiments, a material with a high stretch property may elongate as the foam expands. Such elongation may be selected for some portions of the footwear article that are desired to expand. Further, such high stretch properties may be desired if a portion of the footwear article is to expand up against an external form to pick up shape, texture and detail of the external form. In other embodiments, a low stretch property material may be used to prevent the foam from flowing into other areas of the shoe. In many embodiments, the footwear-structure bag, also referred to herein as a shell, may have a combination of materials, each with a select stretch property. In example embodiments where a strobel sock is integrated with the footwear structure bag, the strobel sock may comprise a highly stretchable fabric such that the fabric may expand to allow room for an elongated last and shrink to its original size upon removal of the elongated last. Thus, a first section of an example footwear-structure bag may have a first stretch property while a second section has a second different more elastic or stretch property. Elongation rates of materials may vary from less than 5% (virtually no stretch) to materials exhibiting 300-500% stretch, the stretch being 2-way or 4-way. The stretch properties of materials is described in greater detail below in reference to FIG. 6. Materials with higher stretch may be those used for a strobel sock. Furthermore, materials used may comprise knitted, woven, non-woven, and leather as non-limiting examples.

In this way, a footwear article may comprise: a footwear-structure bag encompassing an injected foam, the footwear-structure bag forming an integrated footwear component; a strobel sock made of stretchable material integrated into an insole region of the footwear-structure bag; and an outsole directly coupled to the footwear-structure bag forming a base of the footwear article. In some examples, the footwear-structure bag may additionally comprise a foam barrier disposed adjacent to the footwear-structure bag to retain the injected foam within the footwear-structure bag during injection. The foam barrier may comprise one or more of urethane and waterproofing coating. Additionally or alternatively, the foam barrier may be disposed on an internally facing surface of the footwear-structure bag. However, in other examples, the foam barrier may comprise a first layer disposed on an internally facing surface of the footwear-structure bag, and a second layer disposed on an externally facing surface of the footwear-structure bag, where the first layer and second layer may be coupled to one another along a seam. The seam may comprise one or more of radiofrequency welds, expandable threads, and waterproof sealants.

The stretchable material of the strobel sock may have a 300-500% stretch. Additionally or alternatively, the stretchable material of the strobel sock may have a 4-way stretch. Further, the stretchable strobel sock may be stitched into the insole region of the footwear-structure by a stitch and turn seam. In some examples, the injected foam may have a hardness of 35-60 Asker C. The footwear article may further comprise one or more cutout sections in the footwear-structure bag. A lining fabric may additionally be coupled to an internally facing surface of the footwear structure bag, and may border the cutout sections.

Figure 2:
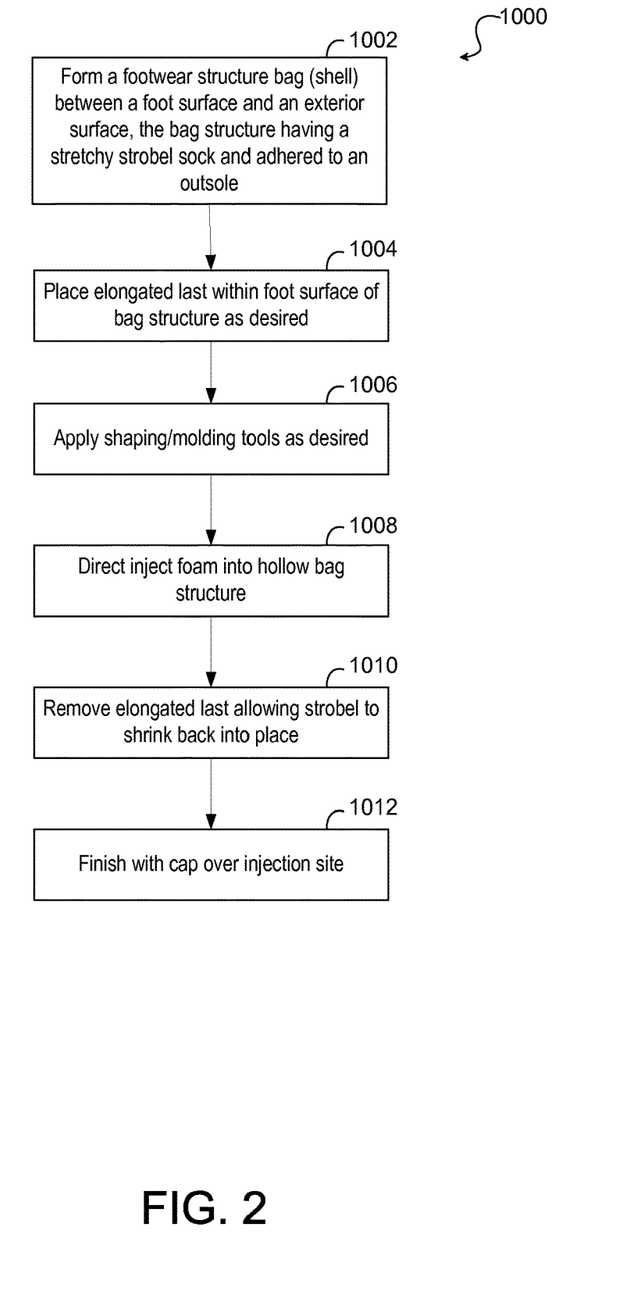
FIG. 2 illustrates an example process flow of a method of making strobel lasted port-injection footwear in accordance with an embodiment of the disclosure.

Turning now to FIG. 2, a process flow 1000 of an example embodiment for forming a strobel lasted, port-injection footwear article is provided. As shown at 1002, a hollow bag structure (also referred to herein as a shell) with an integrated strobel sock is formed between a foot surface and an exterior surface. An outsole is attached at the base of the hollow bag structure. The outsole may be attached to the hollow bag structure by gluing, stitching, tacking, or combinations or variations of methods of adhering thereof. As discussed above, the hollow bag structure or footwear-structure bag may be adapted to create a suitable shape for a selected type of footwear and footwear design and a strobel sock may comprise the insole region of the footwear-structure bag.

An elongated last may be used to provide the internal shaping. In one example, the elongated last may be placed within the foot-facing surface of the hollow bag structure during injection of foam at 1004. The elongated last is extended in the insole region at its base such that a stretchable strobel sock is expanded in the direction of a footwear outsole in the presence of the elongated last. In addition to expansion of the stretchable strobel sock, the elongated last may impart qualities into a finished article of footwear such as shaping or sizing of the foot-facing surface of an article of port injected footwear. For example, because the footwear of the present disclosure may be injected with foam that expands to take a shape imposed on it by the hollow bag structure and molds, utilizing identical elongated lasts may create footwear with superior consistency in sizing.

In addition to the elongated last, at 1006, shaping and molding tools may be applied to the exterior of the footwear-structure bag prior or during port or foam injection. These molds, bands, strapping or other shaping tools provide an area of compression for the foam to expand against as the foam fills the hollow bag structure. This shaping may serve to increase performance features of the footwear, minimize weight and/or increase flexibility. Furthermore, as another example, the shaping may be used for aesthetic purposes and may include patterns, textures or bands.

The hollow bag is then direct injected or port injected with foam at 1008. The foam is injected through one or more inlet injection ports or valves in the bag. The foam injector, also referred to as a port injector, is positioned to release foam into the bag. In some embodiments, valve tips may be used to extend the port injector further into the bag or the injection port of the bag.

The port injector may be an injector from a direct inject polyurethane machine. Foam, such as polyurethane, is injected into the hollow bag structure to inflate the shell and form a footwear article. In an alternate embodiment the shell of the port-injection footwear may contain several isolated bag structures each with a foam barrier separated by seaming, welds, adhesives or another method through which injected foam may not permeate. These different hollow bag sections may adopt many variations as far as orientation, composition and fill, of which examples are further discussed below herein.

An outsole may be directly attached to the hollow bag structure prior to injecting foam to provide a base structure for the foam to expand against. In some examples, a bottom plate may also be used to support the outsole during inflation of the hollow bag structure. The bottom plate may be a cradle to support the inflating structure. The bottom plate may be configured to control the tread (heel versus forefoot thickness) and the flatness of the surface that contacts the ground. The bottom plate can be shaped to accommodate the complexity of the design.

As discussed above in regards to FIGS. 1A-C, the footwear-structure bag may include a foam barrier such that injection of foam material into the cavity formed by the hollow bag causes retention of foam and expansion of the bag. Furthermore, in some embodiments, the port-injection footwear may be constructed of more than one cavity, where each cavity may be filled with foam (of the same or differing qualities) through their own inlet injection ports and port injector. Thus, each cavity may be fluidically seal from one another, so that foam may not flow from one cavity to another cavity. In other embodiments, and as another example, a single hollow bag structure may contain multiple fill or injection ports.

In the case where an elongated last and/or shaping tools are used, during expansion of the injected foam, the footwear-structure bag may adopt the shape of the inner foot form and exterior design tools. The elongated last may expand a strobel sock integrated into the footwear-structure bag during foam injection such that the strobel sock may shrink to its original size upon removal of the elongated last.

Through this method, the footwear-structure bag may form an integrated footwear component, including one or more portions of the upper of the footwear. As a non-limiting example, structural elements of port-injection footwear may be used to enhance lateral support. Specifically, an integrated sidewall insole and midsole may enhance lateral support. In other embodiments, the integrated footwear component may form other portions of the upper. For example, sidewalls, strobel sock, insole and midsole may all be integrated into the injected foam portion within the footwear-structure bag of the footwear article.

Referring again to FIG. 2, at 1010, the elongated last is removed from an article of strobel lasted, port injection footwear after foam injection. The stretchable material of the strobel sock allows the strobel sock to shrink back to its original size upon removal of the elongate last, thus forming a standard strobel sock in the insole region of the article of footwear. An elongated last may be used in construction of strobel lasted port injection footwear such that the strobel sock is expanded against injected foam and air pockets or bubbles may be avoided.

In some embodiments, a port cap may be disposed to cover the inlet injection port or ports. For example, in the method flow chart of FIG. 2, the footwear may be finished with a cap over the injection site, at 1012. Additional finishing steps may be applied depending on the footwear design. It should be appreciated that the method of the present disclosure simplifies the construction and finishing of footwear when compared to traditional methods of footwear manufacture that require many additional assembly steps and extensive clean-up of equipment.

Molding of an article of footwear in accordance with an embodiment of the present disclosure may make the footwear suitable for adaptation to a variety of performance or fit features. For example, molding around a last allows for adaptation of shoe fit beyond just size and width, and may be used to create an article of footwear with precise fit and support in foot areas such as the arch or ankles. Further, an article of footwear created in accordance with the present disclosure may include performance benefits such as internal vent channels or waterproof, seamless construction. Additionally, the quality of molding may be improved compared to traditional injection molding methods as the injected foam is not exposed to a mold, but rather contained within the hollow bag structure and thus may not be susceptible to flashing.

As described and illustrated in regards to the embodiments below, the disclosed method enables the inside of the footwear to be finished and contoured to match a desired foot shape or to include additional functional or stylistic elements. It is further possible to expand the foam within the hollow bag structure around a customized last thus creating a personalized article of footwear with precise fit. Further, the footwear-structure bag may be positioned fully around a foot form, providing full angle (360 degree) protection.

In this way, a method for constructing a footwear article may comprise stitching a stretchable strobel sock into an insole region of a footwear-structure bag. The method may additionally or alternatively comprise adhering a separately formed outsole to the base of the footwear-structure bag. In some examples, the method may additionally or alternatively comprise inserting an elongated last into the footwear-structure bag. Further, the method may in some examples additionally or alternatively comprise injecting the footwear-structure bag with a foam such that the footwear-structure bag may be expanded by the injected foam around the elongated last and the stretchable strobel sock may be stretched around the elongated last. The method may additionally or alternatively comprise removing the elongated last so that stretchable strobel sock may return to its original shape with the footwear-structure bag encompassing the injected foam. Additionally, or alternatively, the method may comprise shaping the footwear structure bag during the injecting by applying molding tools to an exterior of the bag, where the molding tools may apply a compressive force on the bag. In some examples, injecting the footwear-structure bag with the foam may further comprise inserting a valve tip into an injection port of the footwear-structure bag, and injecting foam into the footwear-structure bag through the injection port. After injecting the footwear-structure bag with the foam, the method may additionally comprise, covering an injection port of the footwear-structure bag with a port cap to retain the foam within the bag.

Figure 3A:
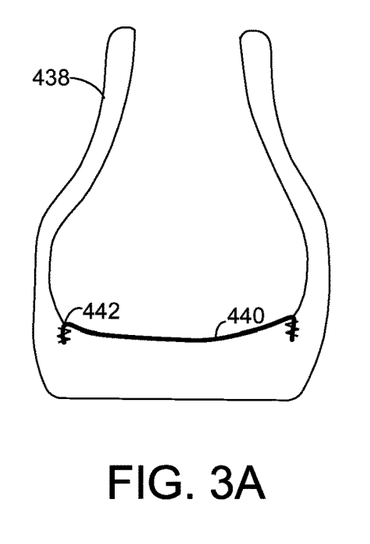
FIG. 3A illustrates a cross-sectional view of a footwear-structure bag with an incorporated strobel sock.
Figure 3B:
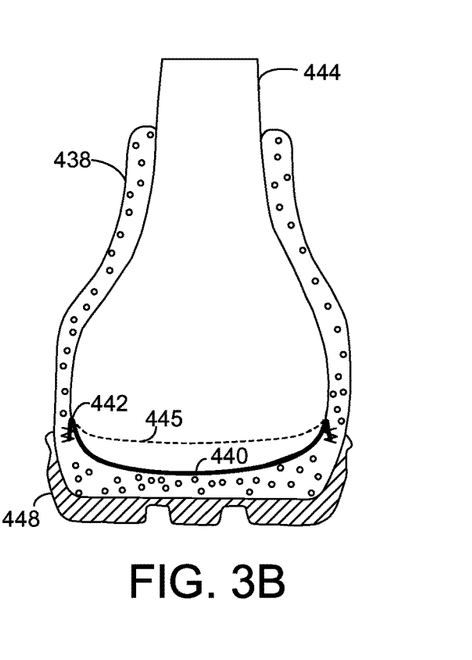
FIG. 3B illustrates a cross-sectional view of a footwear-structure bag with an incorporated strobel sock fit around an elongated last
Figure 3C:
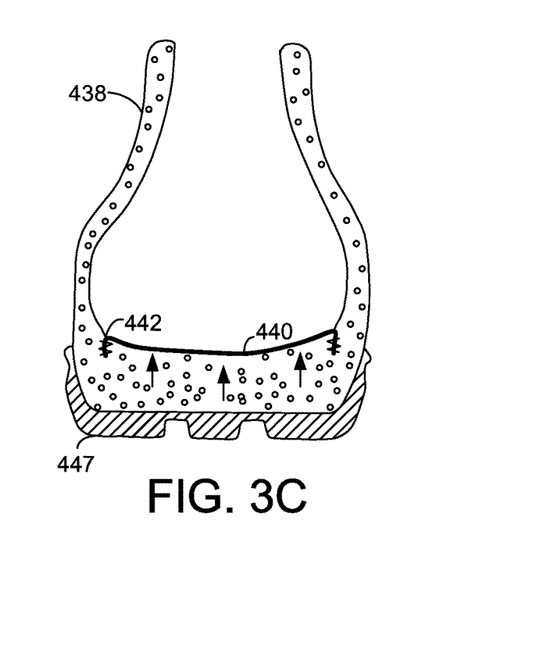
FIG. 3C illustrates a cross-sectional view of an article of port injection footwear with a strobel sock that has shrunk to its original size.

In reference to FIGS. 3A-C, a further embodiment of port-injection footwear is illustrated. The bag may be composed of one or more materials having variable levels of elasticity. In one example, footwear-structure bag 438 may include a surface in the interior of the footwear article, referred to as a strobel sock 440. The strobel sock 440 may be constructed of a highly elastic material, a first material, relative to the other portions of the footwear-structure bag. In some embodiments, the strobel sock may be attached around the entire perimeter of the base of the shoe upper in the insole region. In some examples, the strobel sock may be attached by a stitch and turn seam 442.

FIG. 3B shows an example article of port-injection footwear incorporating a strobel sock. Elongated last 444 may be inserted into the footwear-structure bag 438. As discussed above, the footwear-structure bag may include a strobel sock portion. The strobel sock portion may be attached to the bag via any suitable means, including but not limited to a stitch and turn seam 442.

In an example embodiment, outsole 447 may be press fit to the footwear-structure bag, using elongated last 444 to support the assembly process. Elongated last 444 may occupy more space in the midsole region of the article of footwear when compared to a typical last, shown in dotted line at 445, which occupies the same space occupied by the foot of an end user. The elasticity of the strobel sock adapts to the elongated last 444.

In FIG. 3C, elongated last 444 has been removed and strobel sock 440 may return or shrink back to its original size (indicated by the arrows). Return of the elastic strobel sock to it pre-stretched form ensures desired foot form shaping.

FIG. 4 details an example stitch and turn seam which may be used to integrate a footwear structure bag to a strobel sock. Stitch and turn seam 442 in the footwear-structure bag 438 is shown where a surface of the bag structure is joined to the strobel sock 440. The footwear-structure bag material has a foam barrier 450.

In this example, stitch and turn seam 442 comprises an adhesive layer 448 bonding the strobel sock 440 to the footwear structure bag 438 and its foam barrier 450. Adhesive may be used to increase the durability of a seam or adherence in a footwear structure bag. Furthermore, adhesive may allow a seam to contain injected foam. It should be appreciated that a seam may not include an adhesive layer or that adhesive may be confined to regions of a seam in area, for example in regions that may experience more bending or flexing to reinforce the joining of the two materials.

The stitch and turn seam 442 also comprises stitching 446. Stitching may increase the durability of the seam or may be provided for aesthetic purposes. In the example embodiment shown in FIG. 4 stitching is located on the material surface facing the interior of the footwear-structure bag and is encompassed by foam in a finished article of footwear. However, in another example, stitching may be visible in the interior of the article of footwear in addition to or instead of the stitching contained in the interior of the hollow bag structure.

Figure 5:
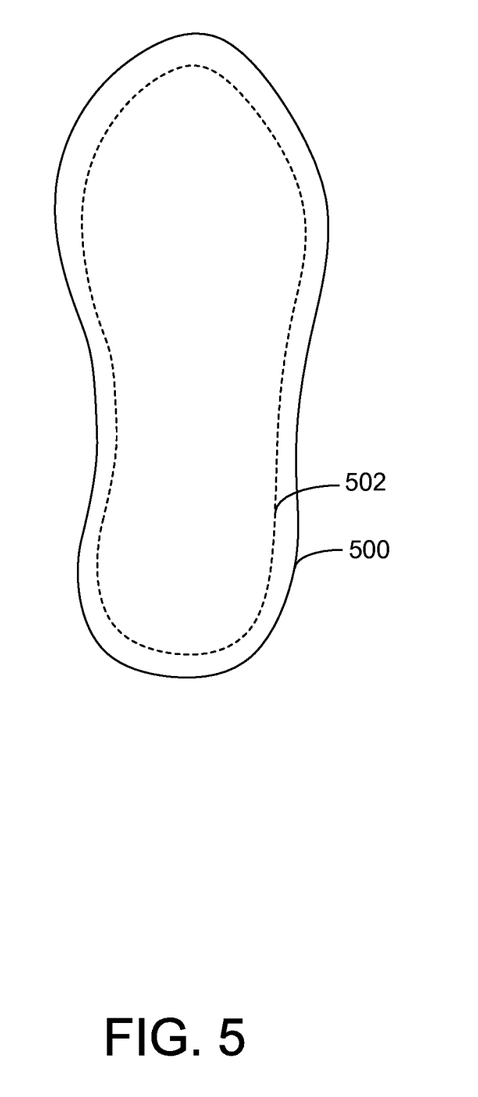
FIG. 5 is an illustration of the area of a strobel sock in accordance with the present disclosure.

Turning now to FIG. 5, a perimeter of a strobel sock 502 is shown in the footprint 500 of an article of strobel lasted port-injection footwear. In a non-limiting example the whole perimeter of the strobel sock may comprise a stitch and turn seam such as that shown in FIG. 4. In an alternate example, different seaming or stitching methods may be used to attach portions of the strobel sock, or a strobel sock may be segmented or partial, not extending fully across the insole region of an article of port-injection footwear.

Figure 6:
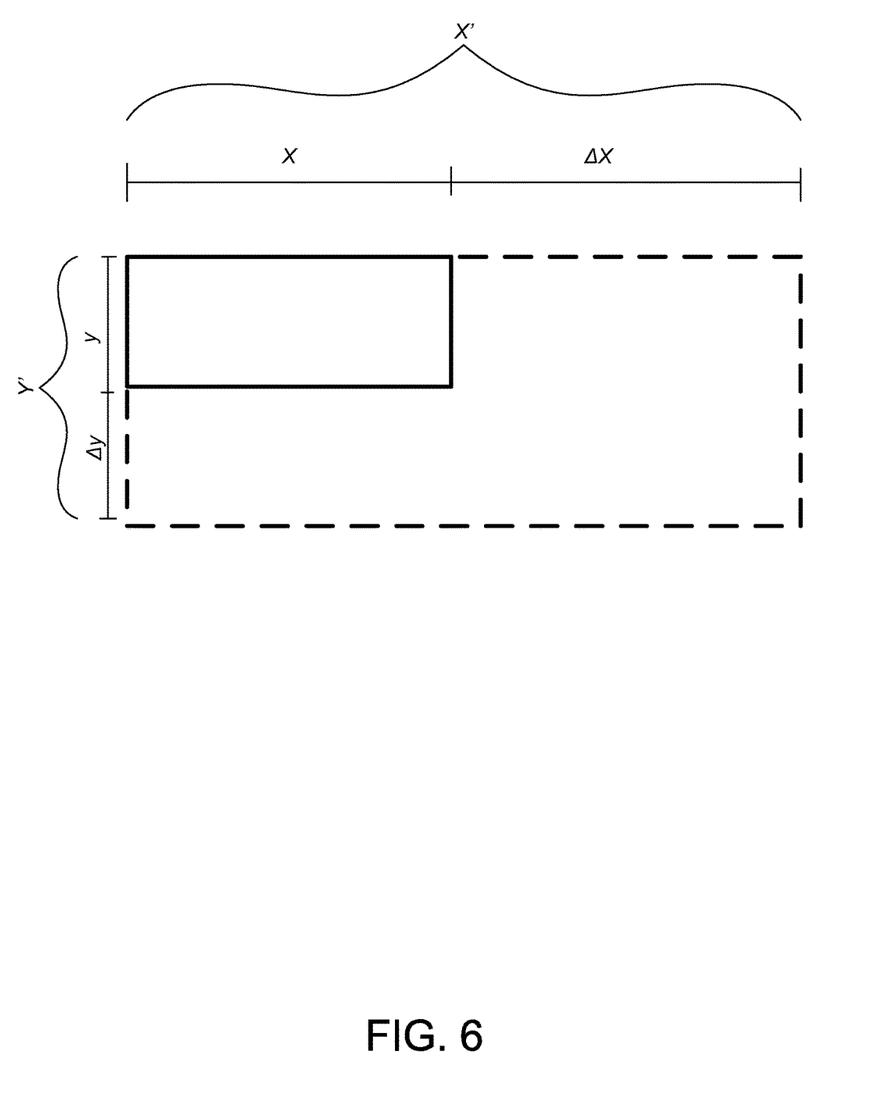
FIG. 6 is an illustration of the stretch properties of an example strobel sock material.

Turning now to FIG. 6, an illustration of the stretch properties of material is shown. In the illustration of FIG. 6 a material with 4-way stretch is shown in that the material, when pulled will stretch in both directions of the x-axis and both direction of the y-axis. In an alternate embodiment, a strobel sock in accordance with the present disclosure may also comprise a 2-way stretch material, in which the material may stretch in both directions of the y-axis and essentially not in the x-axis directions, or conversely may stretch in both directions of the x-axis and essentially not in the y-axis directions.

Elongation rates of materials may vary from less than 5% (virtually no stretch) to materials exhibiting 300-500% stretch. Elongation rates are described in relation to FIG. 6. A material with starting dimensions x and y is shown in bold line. A fabric may be stretched such as to increase its dimensions by $\Delta x$ and $\Delta y$. In the shown example, stretch is possible in both the x and y directions (for 4-way stretch) to achieve maximal dimensions x' and y' (shown in dashed line) beyond which the fabric will tear, rip, or otherwise deform. The elongation rate may be expressed as the original dimension (x) over the dimension of maximized stretch (x') times 100%.

The stretch properties of a fabric may be due to the chemical components of a material, for example threads formed of an elastic polymer. Conversely, or in addition to, the chemical makeup of a fabric affecting stretch properties, the construction of a fabric may further impart stretch. For example, a knit fabric, wherein threads are looped together may stretch more than a woven fabric, in which threads are overlaid in a crisscrossed pattern. Materials used in the construction of a footwear structure bag of the present disclosure may be chosen for their stretch properties. As a non-limiting example, the body of the footwear-structure bag may be comprised of minimally stretching material, a second material, whereas the strobel sock portion of the footwear-structure bag may be comprised of a highly stretchable material, the first material, that can expand against an elongated last used in the construction of an article of footwear.

In this way, a footwear article may comprise a footwear-structure bag defining a hollow interior cavity the footwear-structure bag forming an integrated footwear component. The footwear article may additionally comprise a foam injected into the hollow interior cavity of the footwear-structure bag via an injection port integrally formed on the footwear-structure bag. In some examples, the footwear article may additionally or alternatively comprise a strobel sock made of stretchable material integrated into an insole region of the footwear-structure bag. The footwear article may additionally comprise an outsole directly coupled to the footwear-structure bag forming a base of the footwear article. In some examples, the footwear-structure bag may comprise two or more cavities for receiving the foam, where each cavity may be fluidically sealed from one another, and where each cavity may comprise an injection port. One or more eyelets may additionally or alternatively be integrated into the footwear-structure bag.

Although in the examples of the footwear article shown in FIGS. 1A-4, the strobel sock integrally forms a cavity in the footwear-structure bag, it should be appreciated that in other examples, the strobel sock may also be used to form all or a portion of cavities positioned in other regions of the footwear article such as the outsole, midsole, heel, toe, etc. Further, in some examples, the stretchable strobel may be used in other applications. Thus, it should be appreciated that the stretchable strobel or strobel sock is not limited to only the examples illustrated but that the flexible properties of the strobel sock, including its 4-way stretch, may be used to form cavities in any desired region of the footwear article. As such, cavities may be formed in various regions of the footwear article including, but not limited to: the footwear-structure bag, upper, midsole, heel, toe, insole, outsole, or portions thereof, etc. Further, one or more or each of the cavities formed within the footwear article may be at least partially or wholly formed by the strobel sock. Said another way, the strobel sock may form one or more of the cavities within a footwear article.

As an example, the stretchable strobel construction may be applied to any portion of the footwear where a cavity or void is needed. For example, the outsole may be configured, such that a cavity is formed within the outsole. Thus, walls of the outsole may be integrally formed by one or more or each of a foam barrier, strobel sock, rubber, leather, wood etc., where the walls may define an interior hollow cavity of the outsole. In such examples, the strobel sock may form a portion of the outsole, such that the shape of the outsole may at least be partially defined by the strobel sock. Because of the stretchable properties of the strobel sock, the shape, flexibility, and compressibility of the outsole may be managed. For example, the cavities may be formed to increase flexibility or compressibility. In other examples, the construction may enable use of a material or filler to selectively increase or decrease one or more of the shape, flexibility, and compressibility of the footwear, such as the outsole. Further, an elongated last may be used to shape the outsole during manufacture of the outsole.

In this example, by use of a strobel sock to form one or more cavities in the footwear article, the flexibility, and shape of different regions of the footwear article may be manipulated during manufacture of the footwear article. More specifically, elongated lasts of different shapes and sizes may be used in combination with the strobel sock during injection of foam or other material into the cavities formed within the footwear article, to produce desired properties including the shape, flexibility, texture, etc., of a region of the footwear article including the cavity. Said another way, the shape and/or size of the elongated lasts may be adjusted to impart different properties such as flexibility, shape, size, texture, etc., into the footwear article. Further, an amount of stretch in the strobel sock, and/or an amount of strobel sock used in forming one of the cavities may be varied to achieve desired properties such as the flexibility, shape, texture, etc., of the footwear article.

As an example, in some embodiments, the elongated last may include specific structure to impart a desired feature. For example, the elongated last may be include features to create grooving. During injection of foam or other material into a cavity defined at least partially by the strobel sock, the groove pattern in the elongated last may be imparted on the strobel sock, and therefore the cavity. In examples, where the strobel sock defines a portion of the outsole for example, the strobel sock and/or the last used during injection of the cavity, and therefore, in this example, an outsole, may achieve a desired size, shape, texture, flexibility, etc. Specifically, the flexibility of the outsole may be increased by including grooves on the last used during manufacture of the outsole, so that the grooves are imparted on the strobel sock, thereby increasing an amount that the outsole may bend along a grooved portion. It should be appreciated that these benefits may be applied to any cavity formed within the footwear article using the stretchable strobel construction.

It should also be appreciated that in some examples, more than one last may be used during injection of material into one or more or each of the cavities formed within the footwear article. As an example, a larger first last may be inserted into the footwear article to create a larger first hollow volume within the footwear article. During injection of a material into the cavity formed by one or more or each of the foam barrier and strobel sock, a smaller second last may be inserted into the footwear article to partially fill the larger hollow volume created by the larger first last. In this way, thermal regulation in the footwear article may be improved by use of differently sized lasts. Specifically, by using the larger first last prior to the smaller second last, significant airflow through the footwear article may be maintained. However, in other examples, a smaller first last may be inserted into the footwear article to create a smaller first hollow volume within the footwear article. During injection of a material into the cavity formed by one or more or each of the foam barrier and strobel sock, a larger second last may be inserted into the footwear article to fill and/or expand the volume created by the smaller first last.

In this way, a greater number of shapes, sizes, textures and details for regions of the footwear article may achieved by including the strobel sock and last during injection of foam or other substance into a cavity of the footwear article. Because of the stretchable properties of the strobel sock, the strobel sock may conform to any shape included on the last. Thus, the shape, size, texture, etc., of the last may be imparted to the strobel sock, and therefore the cavity at least partially formed by the strobel sock. By manipulating the shape, size, and/or texture of the last, properties of the region of the footwear article defined by the strobel sock may be manipulated as desired. As foam or another substance is injected into the cavity formed by the strobel sock, the harder injected material may retain the shape of the strobel sock. In this way, the strobel sock may be used to increase the variability of shapes, sizes, and textures in regions of the footwear article where foam or other material such as gel is injected into a cavity defined within the footwear article.

Although the cavities may be injected with foam as described above, it should also be appreciated that the cavities may be injected with a substance other than foam. For example, in cases where the outsole defines a cavity, the outsole may be filled with a gel, rubber, etc. In still further examples, one or more or each of the cavities may be filled with or have alternate substance, including, but not limited to air or other gaseous material. In some examples, the cavities may comprise only air.

In such examples, the cavities formed from the stretchable strobel configuration may enable customization. The customization may be at a manufacture level or at a user level. For example, and not as a limitation, a user may select a specific desired material or property for insertion into a cavity. As such, properties of the footwear article may be adjusted depending on a desired function for the footwear article, specifically by changing material injected into one or more cavities of the footwear article. For examples, a consumer may choose whether to inject one or more of foam, gel, rubber, etc. into the outsole of their footwear article. The material properties may enable customization such that the filled cavity provides a desired characteristic, including, but not limited to, hardness, softness, rebound, durability, flex, etc. As a non-limiting example, a strobel constructed cavity may be formed in an outsole heel region of footwear and a user (or manufacturer) may selectively insert a soft gel to provide an increased softness. Another user, may selectively insert a firm material to provide a firm support. In this way, the versatility of the footwear article may be increased.

Methods in accordance with the present disclosure have been described as they pertain to creation and construction of articles of footwear. However, the method and hollow bag structure with incorporated stretchable component may be applied to construction of additional items where the stretchable component may not be a strobel sock. This may include, for example, bags, backpacks, totes, satchels, luggage, toiletry cases, etc. In addition to articles such as bags the method of the present disclosure could be adapted to construction of cushions, seats, supports, articles of clothing, or playthings as non-limiting examples.

As discussed above, in contrast to prior footwear construction relying heavily on adhesives and extensive hand stitching, construction herein is largely by port injection of the foam. Additionally, multiple molds for each shoe size may not be required by the method in accordance with the present disclosure. Further, molds that are utilized for shaping and detailing may be more easily handled as they do not come in direct contact with injected foam.

As it should be appreciated, the disclosed port-injection footwear provides agility for quick short run solutions. Further, design opportunities are easily accommodated without requiring significant full run resources. Further, the disclosed direct injected footwear process and system provides enhanced customization. For example, the shell may be formed around a foot shape that matches the fit requirement of an individual. Further, aesthetic customization may be provided with soft tooling enabling individual and/or small production runs. For example, a user may customize footwear by inserting a unique icon or letters as an imprint on the footwear upper without requiring significant expensive tooling and time.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A footwear article comprising:
a footwear-structure bag encompassing an injected filler material, the footwear-structure bag forming an integrated footwear component, where the injected filler material is an injected foam;
a strobel sock of the footwear-structure bag that is made of a first material, the strobel sock forming an insole region of the footwear-structure bag, where the strobel sock is coupled to a second material of the footwear-structure bag by a stitched junction at the insole region that directly attaches the first material of the strobel sock to the second material of the footwear-structure bag, where the first material of the strobel sock is a highly stretchable material, and where the second material of the footwear-structure bag is a minimally stretching material that is different than the first material of the strobel sock; and
an outsole directly coupled to the footwear-structure bag forming a base of the footwear article,
wherein the stitched junction is a stitch and turn seam including stitches, and wherein the stitches are located within an interior of the footwear-structure bag, encompassed by the injected foam.

2. The footwear article of claim 1, further comprising a foam barrier disposed adjacent to the footwear-structure bag to retain the injected foam within the footwear-structure bag during injection.

3. The footwear article of claim 2, wherein the foam barrier comprises one or more of urethane and waterproofing coating.

4. The footwear article of claim 2, wherein the foam barrier is disposed on an internally facing surface of the footwear-structure bag.

5. The footwear article of claim 2, wherein the foam barrier comprises a first layer disposed on an internally facing surface of the footwear-structure bag and a second layer disposed on an externally facing surface of the footwear-structure bag, and wherein the first layer and the second layer are coupled to one another along the stitched junction.

6. The footwear article of claim 5, wherein the stitched junction comprises one or more of radiofrequency welds, expandable threads, and waterproof sealants.

7. The footwear article of claim 1, wherein the first material of the strobel sock has 300-500% stretch.

8. The footwear article of claim 1, wherein the injected foam has a hardness of 35-60 Asker C.

9. The footwear article of claim 1, wherein the first material of the strobel sock has 4-way stretch.

10. The footwear article of claim 1, wherein the footwear-structure bag defines more than one cavity, and where each cavity comprises the injected foam.

11. The footwear article of claim 1, further comprising one or more cutout sections that open through the footwear-structure bag and are configured to expose a foot of an end user of the footwear article.

12. The footwear article of claim 11, further comprising a lining fabric coupled to an internally facing surface of the footwear-structure bag, and bordering the cutout sections, but not on the insole region of the footwear-structure bag.

13. A footwear article comprising:
a footwear-structure bag defining a hollow interior cavity, the footwear-structure bag forming an integrated footwear component;
a foam injected into the hollow interior cavity of the footwear-structure bag via an injection port integrally formed on the footwear-structure bag, where the footwear-structure bag includes a body and a strobel sock portion,
wherein the strobel sock portion is made of a 4-way stretch material that is highly stretchable, where the strobel sock portion forms an insole region of the footwear-structure bag and is integrated into the footwear-structure bag via a stitched junction at the insole region which joins the body directly to the strobel sock portion, where the body of the footwear-structure bag comprises a body material that is minimally stretching, the material of the body being less stretchable than the highly stretchable, 4-way stretch material of the strobel sock portion, and where the body material is different than the 4-way stretch material of the strobel sock portion;
a lining fabric coupled to an internally facing surface of the footwear-structure bag; and
an outsole directly coupled to the footwear-structure bag forming a base of the footwear article,
wherein the stitched junction is a stitch and turn seam including stitches, and wherein the stitches are located within an interior of the footwear-structure bag, encompassed by the injected foam.

14. The footwear article of claim 13, wherein the footwear-structure bag further comprises two or more cavities for receiving the foam, each cavity being fluidically sealed from one another, and wherein each cavity comprises an injection port.

15. The footwear article of claim 13, wherein the foam injected into the hollow interior cavity of the footwear-structure bag via the injection port integrally formed on the footwear-structure bag is hardened.

16. The footwear article of claim 1, wherein the stitch and turn seam comprises an adhesive layer and stitches.

* * * * *